United States Patent [19]

Hallberg

[11] Patent Number: 4,492,207
[45] Date of Patent: Jan. 8, 1985

[54] DUAL FUEL SYSTEM
[75] Inventor: John E. Hallberg, Peachtree City, Ga.
[73] Assignee: PetroSystems International, Inc., Nashville, Tenn.
[21] Appl. No.: 239,005
[22] Filed: Feb. 27, 1981
[51] Int. Cl.$^3$ .................. F02B 43/00; F02M 21/04
[52] U.S. Cl. .................. 123/527; 123/577; 48/180 C; 261/16; 261/44 C
[58] Field of Search ........... 123/525, 527, 577; 48/180 C, 180 R, 184; 261/16, 41, 44 C

[56] References Cited

U.S. PATENT DOCUMENTS

| | | | |
|---|---|---|---|
| 1,239,882 | 9/1917 | Chalker . | |
| 1,447,809 | 3/1923 | Neff . | |
| 1,931,698 | 10/1933 | Holzapfel | 261/16 |
| 1,954,968 | 4/1934 | Waters | 123/121 |
| 1,970,425 | 8/1934 | Grabbe | 123/121 |
| 2,073,298 | 3/1937 | Ensign | 48/184 |
| 2,073,299 | 3/1937 | Ensign | 48/184 |
| 2,129,930 | 9/1938 | Hans | 123/127 |
| 2,169,487 | 8/1939 | Ensign | 48/180 |
| 2,240,846 | 5/1941 | Hanson | 137/153 |
| 2,248,222 | 7/1941 | Ensign | 48/180 C |
| 2,636,814 | 4/1953 | Armstrong et al. | 48/180 |
| 2,650,081 | 8/1953 | Rockwell | 261/16 |
| 2,696,714 | 12/1954 | Hughes | 62/1 |
| 2,775,981 | 1/1957 | Zonker | 137/505.12 |
| 2,896,599 | 7/1959 | Ensign | 123/120 |
| 2,939,776 | 6/1960 | McClain | 48/180 |
| 2,969,800 | | Skirvin et al. | 137/7 |
| 3,184,295 | 5/1965 | Baverstock | 48/184 |
| 3,282,664 | 11/1966 | Baverstock | 48/184 |
| 3,329,413 | 9/1967 | Date | 261/41 |
| 3,342,463 | 9/1967 | Date et al. | 261/44 |
| 3,528,787 | 9/1970 | Hallberg | 48/184 |
| 3,846,094 | 11/1974 | Baverstock | 48/180 C |
| 3,984,503 | 10/1976 | Gistucci | 261/39 |
| 4,020,810 | 5/1977 | Baverstock | 123/120 |
| 4,136,139 | 1/1979 | Nakamura et al. | 261/44 C |
| 4,167,547 | 9/1979 | Takamuru et al. | 261/44 C |
| 4,185,054 | 1/1980 | Nakamura et al. | 261/44 C |
| 4,228,111 | 10/1980 | Nakamura et al. | 261/44 C |

OTHER PUBLICATIONS

Impco Carburetion, Inc. Product Data Sheet for Model E LP-Gas Converter.
Impco Carburetion, Inc. Product Data Sheet for Model CA300A Series 20 Mixer.
Impco Carburetion, Inc. Product Data Sheet for CA300A Mixer.
Impco Carburetion, Inc. Schematic of Dual Fuel LP-Gas and Gasoline CA300A Mixer.
Impco Carburetion, Inc. Product Bulletin No. 110.
Beam Products Manufacturing Co., Schematic titled "Typical Automobile or Truck, Straight LP Carburetors".

Primary Examiner—Charles J. Myhre
Assistant Examiner—E. Rollins Cross
Attorney, Agent, or Firm—L. Lawton Rogers, III

[57] ABSTRACT

A dual fuel system for use with internal combustion engines comprising a manually actuated dual fluid valve which alternatively supplies gasoline to the engine's carburetor or engine intake manifold vacuum to a single-stage liquified gas to gaseous fuel converter having a liquified fuel inlet valve actuated in response to intake manifold vacuum by a diaphragm of substantially the same diameter as a second diaphragm which actuates a valve to a converter gaseous expansion chamber where desired gaseous pressure is maintained and is automatically reduced during cruise conditions by compression of a bellows which acts on the second diaphragm in response to reduced engine intake manifold pressure during such cruise conditions, and a pressurized gaseous fuel and air mixer having a plunger structure responsive to venturi vacuum which meters air flow and actuates a valve needle to meter fuel flow. One alternative preferred embodiment of the mixer employs a relatively large piston which travels a relatively short distance within a cylinder and meters flow of air between the lower surface of the piston and a coaxial annular surface defining a passage into which air flows between such surface and the piston together with fuel, which fuel flows into the fuel and air passage through the piston and through a fuel transfer tube that acts as a piston guide. A second alternative preferred embodiment of the mixer utilizes a smaller diameter piston which travels a relatively long distance and a substantially oval plunger which projects into a substantially rectangular air passage to meter air flow.

25 Claims, 14 Drawing Figures

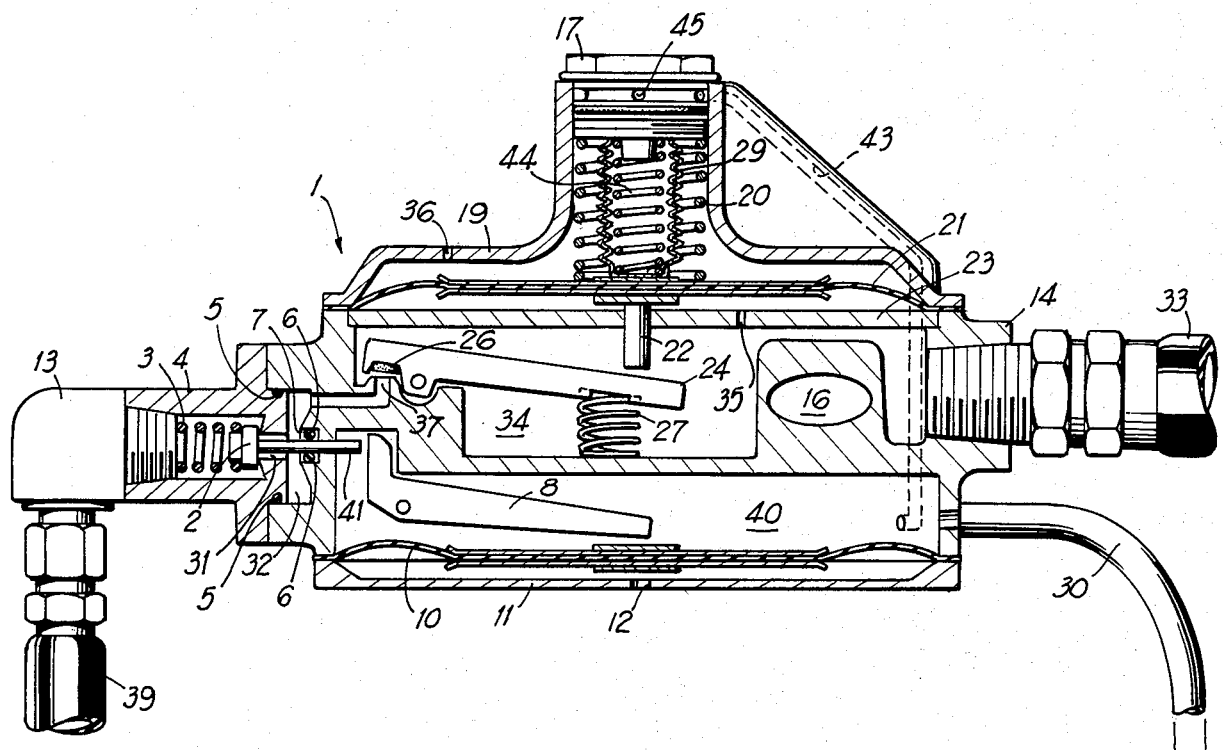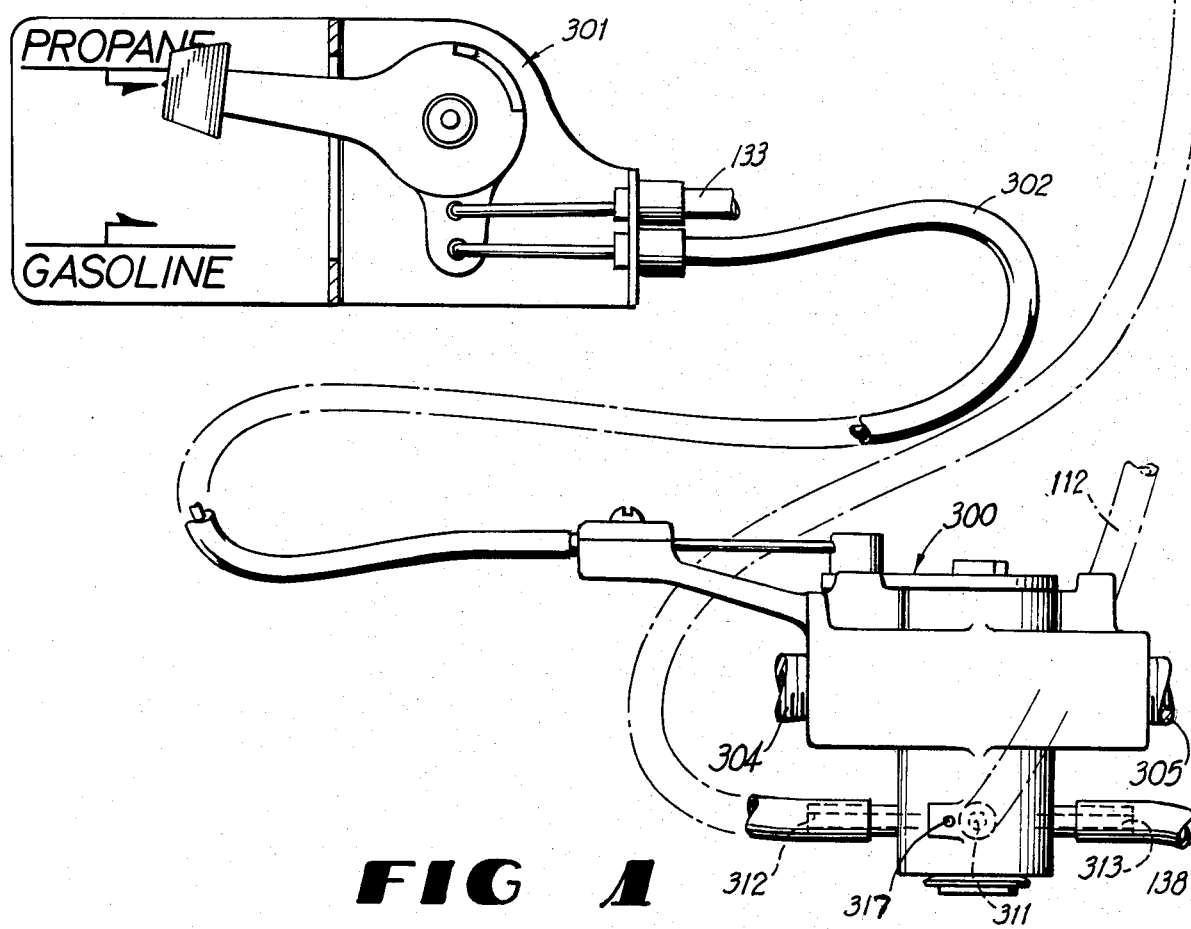
FIG A

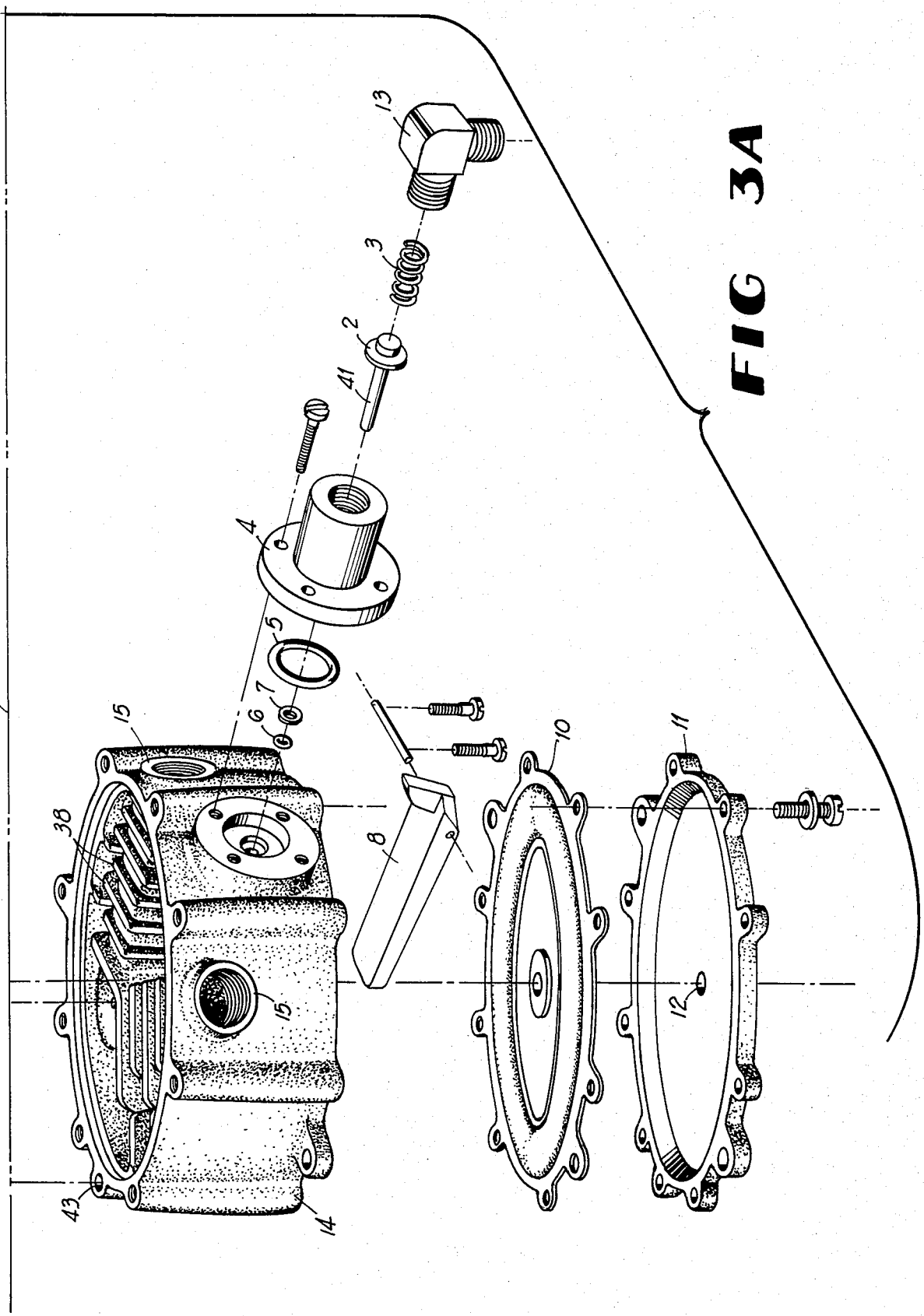

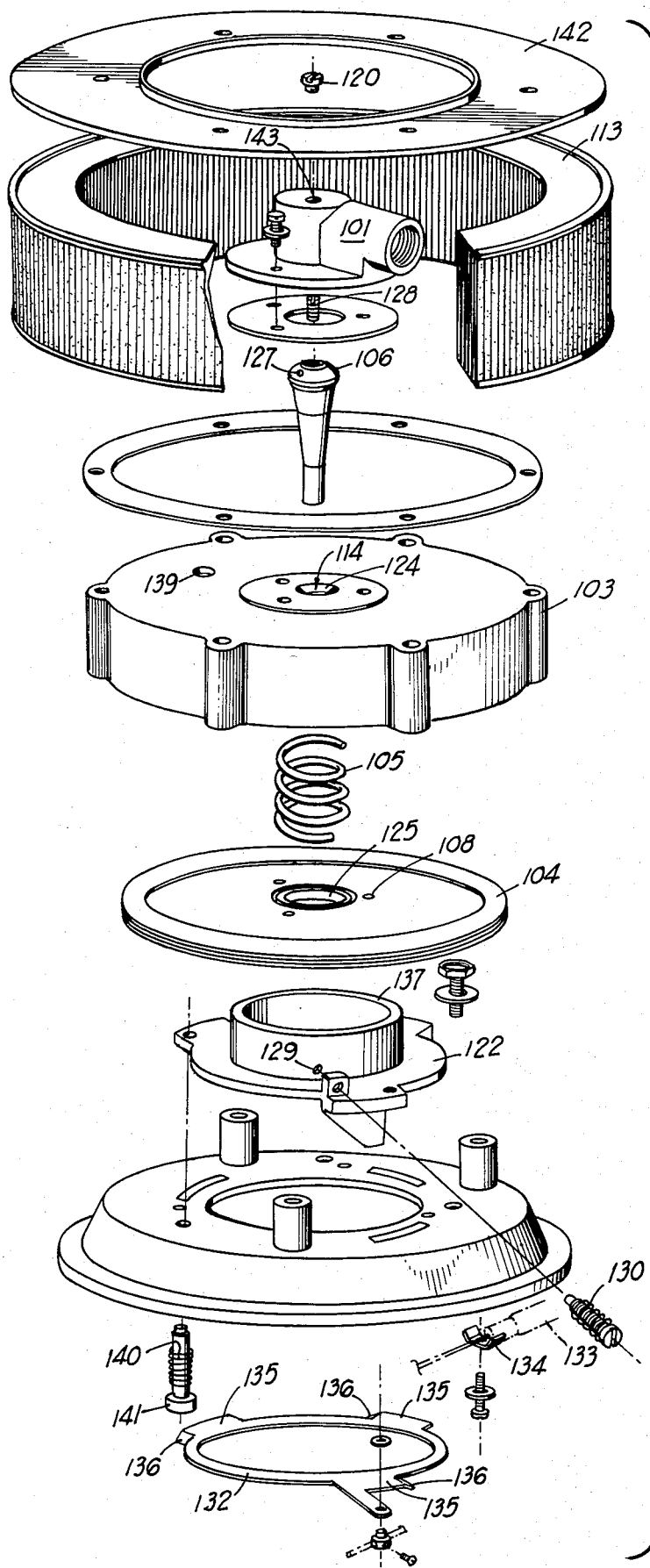

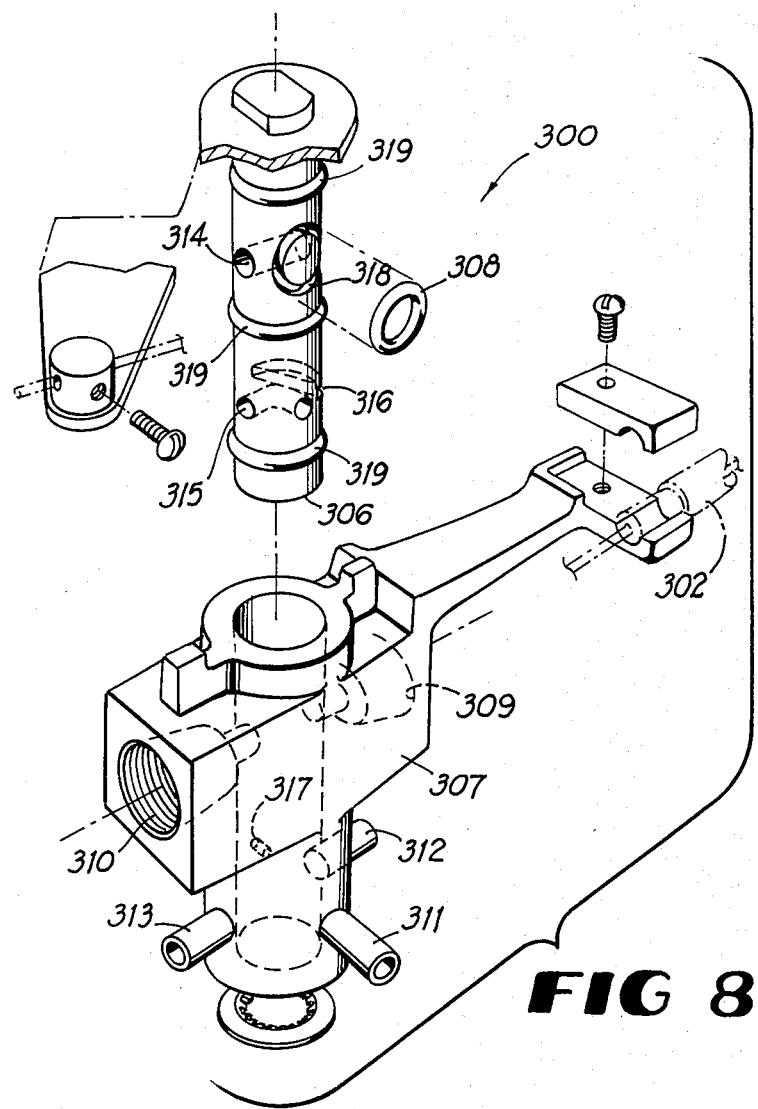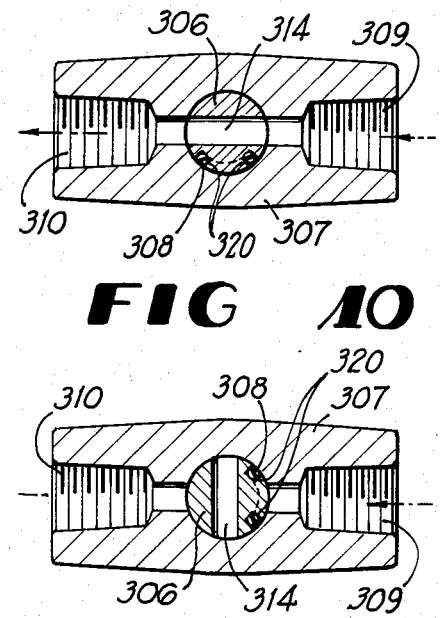
FIG 10
FIG 11
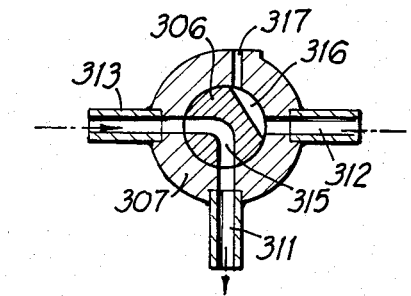
FIG 12
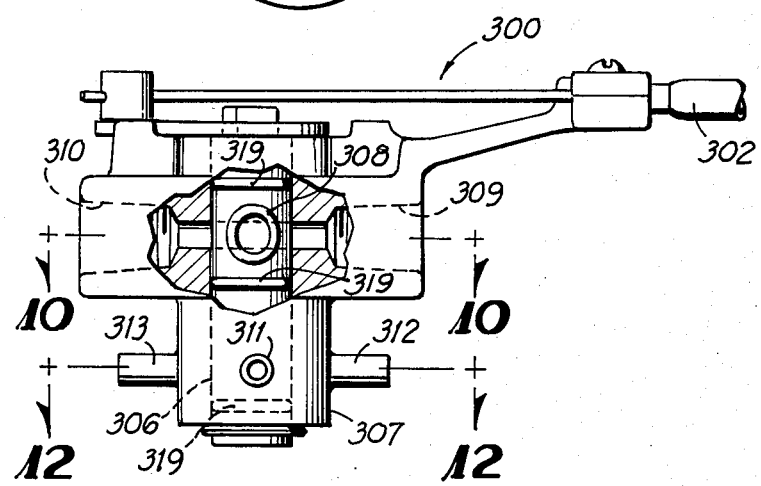
FIG 8
FIG 9
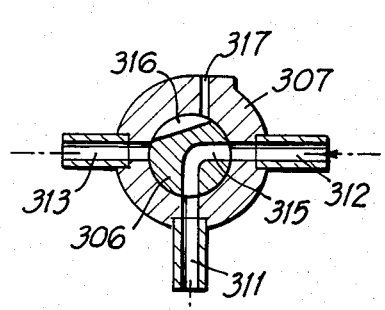
FIG 13

DUAL FUEL SYSTEM

BACKGROUND OF THE INVENTION

1. Field of the Invention

This invention relates to a system for use with a conventional internal combustion engine, such as an automobile engine, to permit alternative utilization of a liquified gas fuel such as liquified petroleum gas, natural gas, hydrogen or propane and a liquid fuel such as gasoline, alternatively selectable by a manually operated control.

2. Description of the Prior Art

Duel fuel systems having manually actuated selection means are well known in the prior art. Illustrative of early duel fuel systems are the following U.S. Pat. Nos.

| Number | Issued | Inventor |
| --- | --- | --- |
| 1,931,698 | October 24, 1933 | Holzapfel |
| 1,970,425 | August 14, 1934 | Grabbe |

Such systems for use with a liquid fuel and a liquified gas fuel typically consist of three principal elements: (a) a means for selecting the fuel to be utilized, (b) a liquified-to-gaseous fuel converter or vaporizer and (c) a gaseous fuel and air mixer or carburetor. Each of these principal elements will be addressed seriatim.

a. Fuel Selection Means

Most conventional modern propane carburetion equipment utilizes electrically operated solenoid valves for alternative selection of fuels. One valve is normally in the liquid propane line running from the propane storage tank of the vehicle adjacent to the inlet to the propane converter or vaporizer, and another is in the gasoline line supplying the carburetor. Such solenoid valves are typically activated by a single pole double throw switch mounted where it may be conveniently operated by the driver to permit alternative selection of propane or gasoline. Such electrically operated solenoid valves are typically the weakest link in conventional dual fuel carburetion systems. They frequently do not work well in the environment of the engine, and it is difficult to locate a reliable voltage source in the vehicle's electrical system which is the right voltage, is available during engine starting and does not affect the ignition system.

At least one prior art dual fuel system utilizes a vacuum operated solenoid valve in the propane portion of the system but retains an electrically operated solenoid valve in the gasoline portion of the system.

b. Converters

Liquified petroleum gas, propane and the other "gaseous" fuels with which the present invention is intended to be used are normally held for use in a reservoir or tank under sufficient pressure and at a temperature such that the fuels are in a liquid state. Thus, such fuels are referred to as "liquified gas" fuels. Conversion of such liquified fuel to a gaseous state at a pressure and temperature usable by conventional internal combustion engines must be accomplished in a converter structure which is accordingly denominated a "liquified gas to gaseous fuel converter" or a "liquified-to-gaseous fuel converter."

Most conventional liquified gas to gaseous fuel converters are of the two stage variety comprising a relatively small diameter first stage, or primary, diaphragm within a chamber warmed by hot engine coolant liquid, which primary diaphragm controls a normally open inlet valve, and a large diameter second diaphragm which controls a normally closed valve.

U.S. Pat. No. 3,528,787, for "Fuel Carburation Apparatus," assigned to the same assignee as the instant application, disclosed a liquified-to-gaseous fuel converter structure comprising a single diaphragm responsive to engine venturi vacuum which actuates an inlet valve. The present invention improves upon the converter element of that patent and conventional converter structures.

c. Mixers

Early propane mixers consisted simply of a tube affixed in the existing gasoline carburetor at a point where the venturi narrows. These so called "spud ins" were acceptable during a period when gasoline and propane were very inexpensive. Subsequent development was directed toward design of a separate propane venturi, and designs for a separate venturi and separate idling system were developed. However, as one skilled in the art will appreciate, a venturi is not very effective as a metering device when air flow is low and slow. Furthermore, a venturi typically has a narrow control range such that it is difficult to design a venturi which will satisfy both low speed and high speed conditions. Accordingly, an ideal system would incorporate a separately engineered venturi for each speed of air flow.

Several mixer designs have been directed to a variable venturi which used a tapered plug device in the opening of the carburetor, with the plug moving up and down in response to variations in air flow. Inherent limitations in such "variable venturi" or "air valve" carburetors are present due to the weight of the plug and short distance of travel. Typically all engine operation conditions must be accommodated within approximately five-eighths of an inch (15.9 millimeters) of plug travel Additionally, such designs exhibit hysteresis problems and relatively poor fuel economy characteristics. Thus, such problems weigh against the utilization of the variable venturi The mixer structures disclosed in U.S. Pat. No. 3,528,787 and utilized in similar "SU" type carburetors employ a plunger structure comprising a round piston acted on by venturi vacuum and atmospheric pressure and a smaller round piston or plunger which variably obstructs air flow through an air passage and from which extends a needle positionable in a fuel orifice on the side of the air passage opposite the plunger structure. Such projection of the needle from the plunger results in a relative large mixer structure.

Another prior art mixer utilizes a relatively large diaphragm to regulate air flow and to move a valve needle to cooperate with an orifice in a mixer structure somewhat similar to one embodiment of the mixer of the present invention.

It is therefore an object of the present invention to overcome the problems associated with prior art dual fuel systems.

It is yet another object of the present invention to provide a dual fuel system adaptable for use with original equipment or for addition to existing equipment, which system fills a need for alternatively selectable fuel provision means.

It is a further object of the present invention to provide a dual fuel system having a mixer which can accommodate relatively large variations in the manufacturing tolerances of its parts.

It is a further object of the present invention to provide a duel fuel system which assists in compliance with strict emission control standards for internal combustion engines by providing for utilization of inherently clean burning propane in conventional vehicles.

It is a further object of the present invention to provide a duel fuel system having a gaseous fuel mixer and to provide a mixer having positive fuel control while minimizing hysteresis.

It is a further object of the present invention to provide a duel fuel system having a liquified gas to gaseous fuel converter in which the converter has a valving structure on which undue pressure is not exerted by the valve actuator when the valve is in the closed position.

It is a further object of the present invention to provide a duel fuel system having a liquified gas to gaseous fuel converter with the converter adapted to operate at very low manifold vacuum pressures such as those experienced during engine starting in cold climates.

It is a further object of the present invention to provide a duel fuel system having a liquified gas to gaseous fuel converter which automatically self adjusts to provide an "economy" fuel mixture during cruise conditions.

It is a further object of the present invention to provide a duel fuel system having a liquified gas to gaseous fuel converter which has an inlet valve which positively locks off incoming fuel even if the inlet valve actuator diaphragm breaks It is a further object of the present invention to provide, in a dual fuel system, a positive acting means for selecting fuel which functions without the use of electricity.

It is a further object of the present invention to provide a duel fuel system having a gaseous fuel and air mixer which is easily adaptable to use with a variety of fuels, including liquified petroleum gas, propane, natural gas and hydrogen as well as other gases usable for combustion in internal combustion engines.

It is a further object of the present invention to provide a dual fuel system utilizing a mixer which is sufficiently compact to occupy substantially only the space within the air cleaner element on conventional engines.

SUMMARY OF THE INVENTION

The present invention achieves these and other objectives in a system which may be used with conventional internal combustion engines, such as automobile engines, to permit alternative utilization of a liquified gas fuel, such as liquified petroleum gas, propane, natural gas, hydrogen or other gases usable for combustion in internal combustion engines, and a liquid fuel, such as gasoline, alternatively selectable by a manually operated control. While other fuels may advantageously be utilized with the instant invention, for the purposes of the following description, it will be assumed that the fuels to be utilized are propane and gasoline unless otherwise indicated The system comprises generally: (a) a fuel selection means generally including a fluid dual valve which may be controlled by a remote control mounted, for instance, on the dashboard of an automobile, (b) a converter for converting the pressurized, liquified fuel, such as propane, to a gaseous state at desired pressures and temperatures and (c) a mixer for combining the pressurized gaseous fuel with air and delivery to the conventional gasoline carburetor Alternative embodiments of the mixer are disclosed. Operation of the dual fuel system is as follows.

Positioning of the fuel selection control in the "gasoline" mode results in opening the vacuum line connected to the converter to the atmosphere and a consequent absence of pressure differential between the two sides of the converter liquid inlet diaphragm and positive lock-off of the converter liquid inlet valve. With the control in such position, a valve in the gasoline line between the gasoline pump and conventional gasoline carburetor is "on," and the conventional carburetor functions in the normal fashion with air passing through the air filter and mixer and into the carburetor. Additionally, there may be optional provision in the "gasoline" mode for opening of the air passage within the mixer or an air bypass around the mixer to facilitate passage of air into the conventional carburetor.

When the "propane" mode is selected, the gasoline valve portion of the fuel selection means is "off," thereby preventing supply of gasoline to the carburetor, and the connection of a vacuum line between the intake manifold of the engine and the converter is completed. When the engine is started, engine intake manifold vacuum reduces the pressure on one side of the converter liquid inlet valve diaphragm, resulting in movement of the diaphragm against a liquid inlet valve lever as a result of atmospheric pressure on the opposite side of the inlet valve diaphragm. Movement of the inlet valve lever urges the liquid inlet valve open, thereby permitting liquid propane to enter a fuel passage in the converter. Propane is admitted through a second valve in the converter structure into a gaseous fuel chamber where it expands to a gas with the resulting gas pressure normally being regulated to 11 inches w.c. Such regulation is achieved by a second, or main, diaphragm which is spring biased on one side to actuate the gas valve and is urged by increased pressure within the chamber on the other side of the second diaphragm to allow the gas valve to close.

In the preferred embodiment, the liquified fuel inlet valve diaphragm is substantially the same size as the second, or main, diaphragm. Utilization of such a large inlet valve diaphragm results in very quick starting capability because relatively little drop in intake manifold pressure is required to activate the inlet valve. Such a small drop in manifold pressure at starting is common with the low engine starting speeds normally experienced during cold weather conditions.

Elevation of the temperature of the propane to encourage vaporization is achieved in a portion of the gaseous fuel chamber where fins are warmed by heat from engine coolant piped through the body of the converter. Such vaporization of the propane and elevation of its temperature is achieved primarily during cruise and medium speed operation of the engine. At higher speed operation, propane is elevated in temperature less, which is desirable since it is beneficial for an engine to run with cooler propane at higher speeds because the volumetric efficiency of the engine is thereby improved. Accordingly, the engine will run slightly richer at the wide open throttle position.

Conversely, during cruise conditions, engine coolant elevates the temperature of the propane, thereby increasing its volume and resulting in a leaner fuel mixture. Additionally, a duct from the engine manifold pressure chamber of the converter communicates with a bellows and bellows spring structure which is located inside the second diaphragm spring such that the second diaphragm is biased by the bellows and bellows spring structure toward the gaseous fuel chamber. During cruise conditions, the engine intake manifold vacuum, which is between 7 inches h.g. and 20 inches h.g., causes the bellows to contract, thereby decreasing pressure on the second diaphragm, which in turn reduces the pressure in the gaseous fuel chamber from approximately 11 inches w.c. to approximately 8 inches w.c. This further reduces fuel flow during cruise conditions, thereby insuring a lean fuel mixture which is desirable for fuel economy during cruise conditions.

The mixer of the instant invention, which is shown and described in alternative embodiments, utilizes a plunger structure and tapered member or needle to meter fuel and air flow in response to engine demand. The plunger structure in the first embodiment is a relatively large round piston which provides a larger effective surface area than a diaphragm of the same diameter, thereby resulting in more effective fuel and air control because the ratio of piston surface areas subjected to pressure differentials is greater than the same ratio on similar diaphragm type mixers. In the second embodiment, the plunger structure is a smaller round piston with a projecting portion having a cross section which is substantially oval (e.g., of elongated cross section having two parallel sides and half-circular ends). In both embodiments the piston is actuated by atmospheric pressure and engine vacuum. Engine vacuum is communicated to the side of the piston away from the air passage while atmospheric pressure is maintained on the opposite side of the piston. Attached to the plunger structure is a needle which extends into an orifice thereby forming a needle valve fuel meter. Engine vacuum actuates the piston, which opens the needle valve and supplies a fuel and air mixture to the engine (through the conventional carburetor), thereby tending to increase pressure within the mixer, which results in stable piston positions and uniform fuel flow at various engine speeds.

In the first embodiment of the mixer of the present invention air flow is regulated by the distance between one face of a large round piston and an annular surface coaxial with the piston. Since the area of the "cross section" of the air passage in this embodiment is effectively the product of the diameter of the annular surface multiplied by the distance of the piston from that surface, a relatively large volume of air is admitted for a given increment of piston travel, and total piston travel can be relatively short, permitting design of a compact mixer. In the second embodiment of the present invention control of air flow is achieved, in part, by using an oval plunger which affords a greater ratio of air control surface area to surface area of the piston covered by the plunger than the ratio achieved in round plunger mixers. Thus the ratio of the area of the cross section of the air passage to piston diameter is relatively large, permitting a compact mixer.

In the second embodiment of the mixer of the present invention, unlike the structure disclosed in U.S. Pat. No. 3,528,787 and similar "SU" type carburetors, the valve needle is mounted entirely within a cavity in the plunger which controls air flow, and the needle projects into an orifice located at the end of a gaseous fuel passage formed by a fuel transfer tube also entirely within the plunger cavity (when the plunger fully occludes the air passage). Such structure provides a compact mixer while utilizing a very long needle to allow accurate control of fuel flow, and the fuel transfer tube may be utilized as a guide for the plunger/piston structure, obviating the need for such a separate guide within the cylinder in which the piston travels or elsewhere. Such relatively long piston travel also substantially lessens any effect of hysterisis because the effect of any hysterisis which may be experienced is negligable by comparison to the total piston and needle travel.

The needle may also be mounted partially within a cavity in the piston in the second embodiment of the mixer of the present invention, and a fuel transfer tube acts as a piston guide, but there are certain structural differences between the two mixer preferred embodiments which will become apparent by reference to the drawings and detailed description which follows.

The foregoing and other objects and advantages of the present invention, as well as the details of an illustrative embodiment and alternatives thereto will be more fully understood from the following description of the drawings, in which:

BRIEF DESCRIPTION OF THE DRAWINGS

FIG. 1 is a side elevational partial cross-section of the converter assembly with schematized fluid dual valve and valve control means.

FIG. 3A is an exploded perspective view of the body and lower portions of the converter assembly.

FIG. 4 is an exploded perspective view of the first embodiment of the mixer assembly.

FIG. 8 is an exploded perspective view of the fluid dual valve assembly.

FIG. 9 is a side elevational view of the valve assembly shown in FIG. 8 with a portion of the valve body cut away to show a portion of the internal construction of th fluid dual valve.

FIG. 10 is a cross sectional view taken along lines 10—10 of FIG. 9 when the dual fluid valve is in a first, "gasoline on," position.

FIG. 11 is a cross sectional view similar to FIG. 10 with the valve spool rotated 90 degrees to a second, "propane on," position.

FIG. 12 is a cross sectional view taken along lines 12—12 of FIG. 9 when the dual fluid valve is in the first, "gasoline on," position.

FIG. 13 is a cross sectional view similar to FIG. 12 with the valve spool rotated 90 degrees to the second, "propane on," position.

DESCRIPTION OF THE PREFERRED EMBODIMENTS

Figure 2:
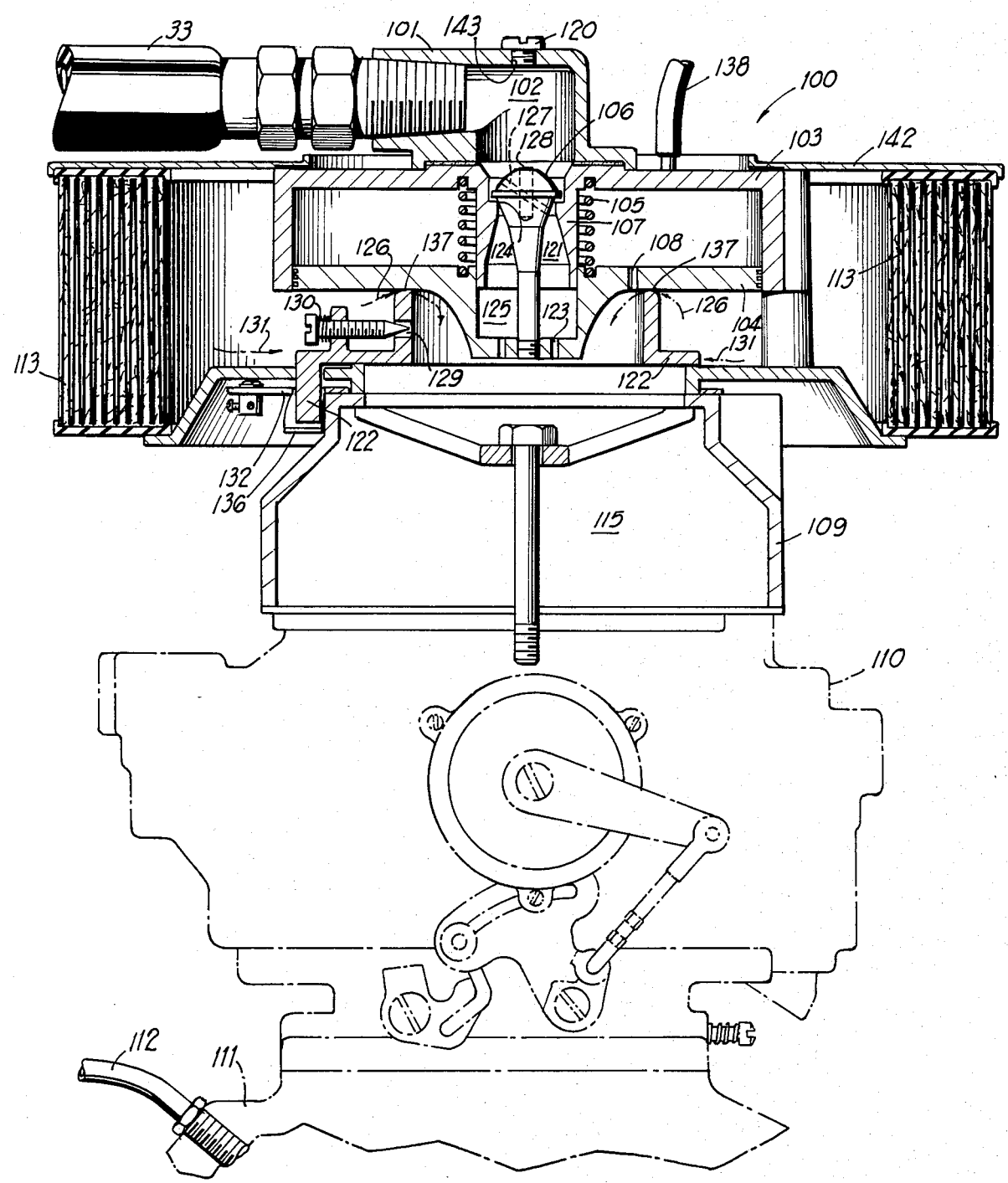
FIG. 2 is a side elevational cross section of a first embodiment of the mixer assembly shown mounted on a conventional carburetor.
Figure 3B:
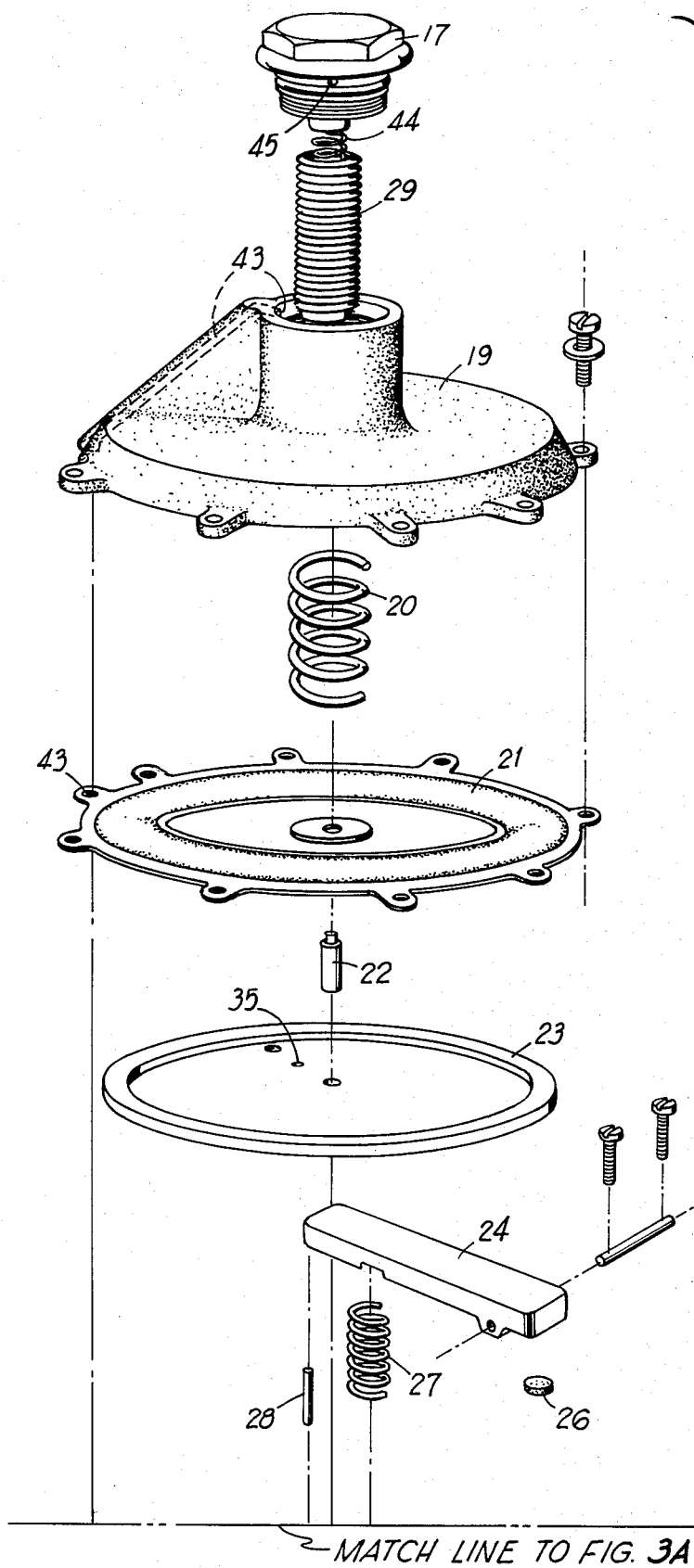
FIG. 3B is an exploded perspective view of the top and upper portions of the converter assembly with a portion of a duct 43 shown in dotted lines.
Figure 5:
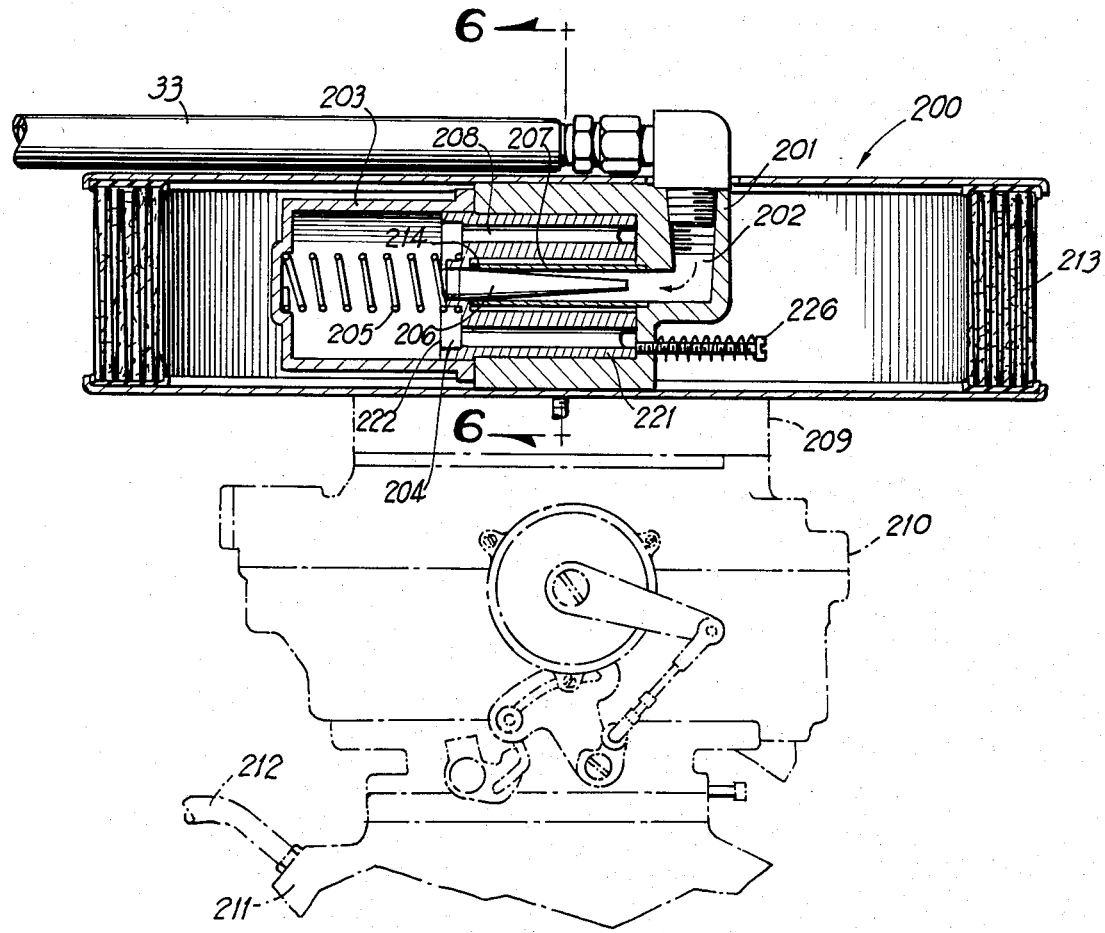
FIG. 5 is a side elevational partial cross-section of the second embodiment of the mixer assembly shown mounted on a conventional carburetor.
Figure 6:
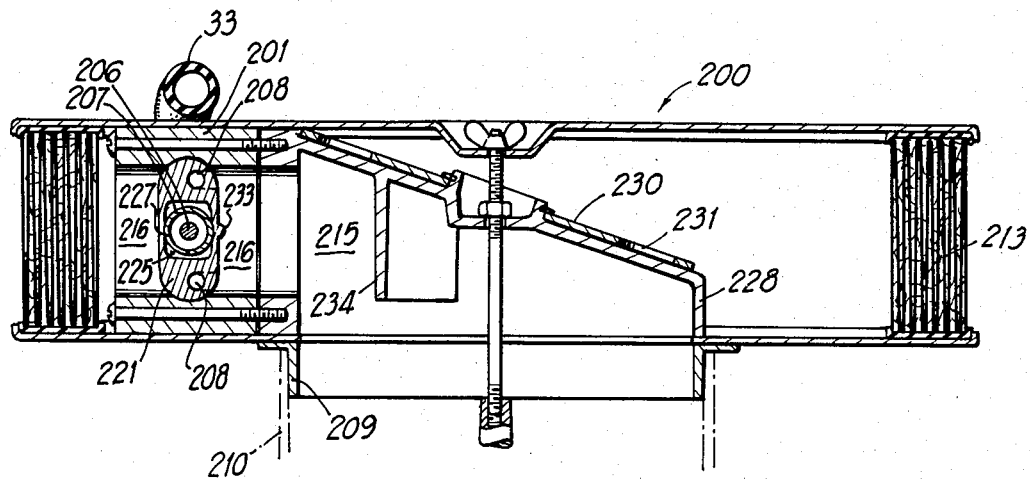
FIG. 6 is an elevational cross-section taken along the lines 6—6 in FIG. 5 of the second embodiment of the mixer assembly.
Figure 7:
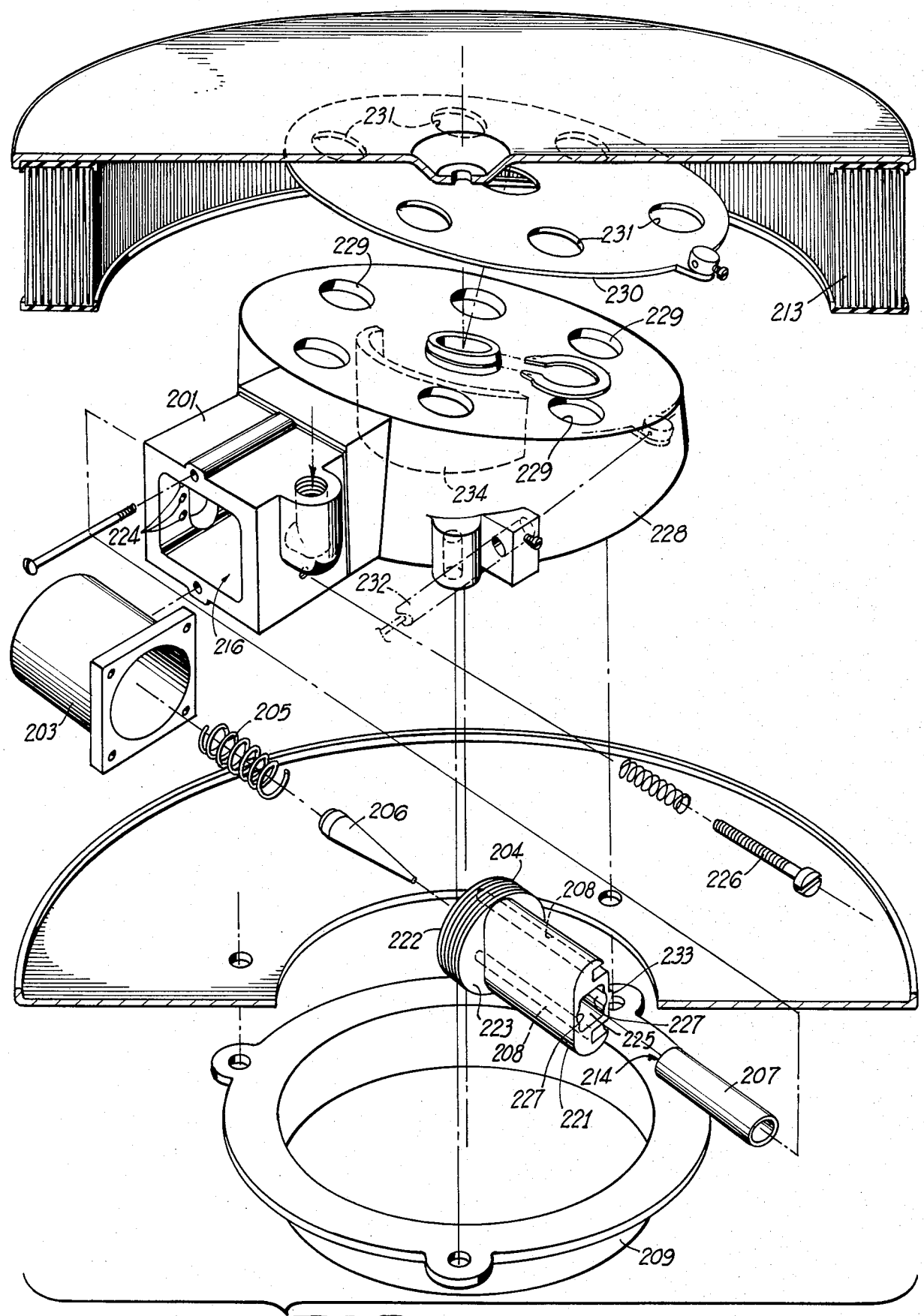
FIG. 7 is an exploded perspective view of the second embodiment of the mixer assembly.

The converter and fuel selection means of the invention are shown in FIG. 1 and two alternative embodiments of the mixer portion of the invention are shown in partial section in FIG. 2 and in FIGS. 5 and 6. An exploded view of the converter assembly is shown in FIGS. 3A and 3B, an exploded view of the fluid dual valve is shown in FIG. 8 and exploded views of the alternative embodiments of the mixer portion of the invention are shown in FIGS. 4 and 7. In the figures, 1 is the liquified-to-gaseous fuel converter structure, 300 is the fluid dual value structure and 100 and 200 are alternative embodiments of the mixer structure.

Operation of converter structure 1 and fluid dual valve structure 300 is the same, except as specifically indicated hereinafter, with mixer embodiment 100 and mixer embodiment 200, which are shown mounted on conventional carburetors 110 and 210 in FIGS. 2 and 5, respectively. Carburetors 110 and 210 are shown in FIGS. 2 and 5 mounted on engine intake manifolds 111 and 211, to which are connected intake manifold vacuum lines 112 and 212, respectively. Accordingly, mixer 100, carburetor 110, engine intake manifold 111, and intake manifold vacuum line 112 alone will hereafter be referred to in description of converter structure 1 and fluid dual valve structure 300, but it should be understood that such description is equally applicable to operation of converter structure 1 and fluid dual valve structure 300 with mixer 200, carburetor 210, engine intake manifold 211 and intake manifold vacuum line 212, respectively, unless otherwise specifically indicated.

Referring to FIGS. 1, 8 and 9, the fuel to be utilized is selected by positioning fluid dual value control 301 in one of two positions, either "gasoline" or "propane." Positioning of control 301 in the "gasoline" mode acts through control cable 302 to rotate spool 306 within valve body 307 such that converter vacuum line 30 shown in FIG. 1 communicating with first vacuum outlet port 312 is open to the atmosphere through notch 316 in spool 306 communicating, as shown in FIG. 12, between first vacuum outlet port 312 and vent 317. The vent 317 communicates with the atmosphere when valve control 301 is in the "gasoline" mode. Simultaneously, gasoline from gasoline supply line 304 is supplied to the carburetor 110 through engine gasoline line 305, which lines communicate through tunnel 314 (see FIG. 10) connecting liquid inlet opening 309 and liquid outlet opening 310 in fluid dual valve 300. In this mode, the carburetor functions normally.

Liquid inlet diaphragm 10 in converter 1 is peripherally clamped between converter body 14 and converter base plate 11 such that the top side of diaphragm 10 is exposed to the pressure condition within converter vacuum line 30, which is atmospheric pressure during "gasoline" mode operation. The bottom side of liquid inlet diaphragm 10 is subjected to external atmospheric pressure at all times via converter base plate bleed 12.

Plunger-type liquified fuel inlet valve 2 is spring biased, as by liquid inlet spring 3, such that when pressure on opposite sides of liquid inlet diaphragm 10 is equal, liquid inlet lever 8 is not lifted, and the inlet valve 2 is closed.

Leakage of pressurized propane from supply 39 through inlet valve fitting 13 and into converter 1 is prevented by liquid inlet body O-ring 5 which creates a seal between liquid inlet body 4 and converter body 14. Sealing around liquified fuel inlet valve shaft 41 is provided by liquid inlet valve O-ring 6 which is held in place by liquid inlet valve O-ring retainer 7. Liquified fuel inlet valve 2 and the related structures of the present invention thus provide a "lock-off" of liquified gaseous fuel supplied to the converter 1 because the valve 2 will remain closed even if the integrity of converter vacuum line 30 is broken or liquid inlet diaphragm 10 is ruptured.

When the "propane" mode of control 301 is selected, spool 306 is rotated within valve body 307 by control cable 302 such that O-ring 308 on the face of spool 306 forms a seal between spool 306 and valve body 307 around liquid inlet opening 309, as shown in FIG. 11, thereby prohibiting flow of gasoline to conventional carburetor 110 and preventing leakage of gasoline from gasoline supply line 304. Referring to FIG. 8, O-ring 308 is seated in a slot 318 milled into the face of spool 306. The walls of slot 318 are substantially parallel to the radius of the spool 306 at each incremental segment of the slot. Thus, as may be observed in FIGS. 10 and 11, opposing segments of the inner slot wall 320 proximate the greatest arc of the spool 306 oppose each other at an acute angle, as do the elements of the letter "V," and thereby capture the O-ring 308 and hold it in place in slot 318. Seal rings 319, which may be O-type rings, seated in circumferential slots (not shown) in spool 306, provide seals to the atmosphere and provide bearing surfaces which separate spool 306 from valve body 307.

Simultaneously, during "propane" mode operation, duct 315 within spool 306 is aligned to communicate with vacuum inlet port 311 and first vacuum outlet port 312, as is shown in FIG. 13, thereby connecting converter vacuum line 30 (shown in FIG. 1) through outlet port 312 and inlet port 311 to intake manifold line 112, which connects to engine intake manifold 111 shown in FIG. 2.

When the engine (not shown) is started, intake manifold starting vacuum, communicated to engine intake manifold pressure chamber 40 in converter 1 shown in FIG. 1 through lines 112 and 30 and fluid dual valve 300, creates a reduced pressure on the upper side of the liquid inlet diaphragm 10. Atmospheric pressure on the opposite (lower) side of diaphragm 10 urge diaphragm 10 upward against liquid inlet lever 8, the opposite end of which drives inlet valve shaft 41 against bias spring 3 and opens liquid inlet valve 2. Thus, liquified gaseous fuel flows through inlet valve orifice 31 into liquified fuel passage 32.

Pressure constantly exerted on the top side of main diaphragm 21 by a yieldable means, such as main diaphragm spring 20 and bellows 29 (more fully explained below) urges main diaphragm 21 against valve actuator stem 22, which in turn actuates fuel lever 24. Once actuated, fuel level 24 lifts fuel outlet cover 26, typically sponge, from fuel outlet 37, thereby permitting flow of fuel into gaseous fuel chamber 34. As pressure within gaseous fuel chamber 34 reaches that desired, the bias of spring 20 and bellows 29 is overcome and main diaphragm 21 moves upward, permitting fuel level 24 to seat fuel outlet cover 26 on outlet 37, thereby stopping flow of fuel into gaseous fuel chamber 34.

As the mixer 100 admits pressurized gaseous fuel to the engine, as will be more fully explained below, through gaseous fuel line 33 when the engine is being started or is running, the pressure within gaseous fuel chamber 34 of converter 1 is reduced. Such reduction of pressure is communicated to the lower side of main diaphragm 21 through opening 35 in guide plate 23. Consequently, main diaphragm 21 is urged downward by atmospheric pressure communicated to its top side through orifice 36 in converter top 19 and by the force exerted by main diaphragm spring 20 and optional bellows 29. Such downward movement again moves stem 22 against fuel lever 24, thereby lifting fuel outlet cover 26 from fuel outlet 37 and permitting additional flow of gaseous fuel into gaseous fuel chamber 34 to maintain the desired pressure. Stem 22, which acts as a valve actuator, is guided by guide plate 23 and contacts but is not connected to fuel lever 24 so that no force in addition to that exerted by fuel lever spring 27 is exerted on fuel lever 24 and fuel outlet cover 26 when main diaphragm 21 moves upward beyond the point at which fuel outlet cover 26 is fully seated. This prevents undesirable pressure on and compression of fuel outlet cover 26. Rotation of guide plate 23 within body 14 is prevented by guide plate pin 28 as shown in FIG. 3B.

The pressure of gaseous fuel within gaseous fuel chamber 34 is normally regulated to a pressure of approximately 11 inches w.c., achieved by selection of main diaphragm spring 20 and bellows 29 and bellows spring 44 to provide the desired pressure.

Fuel flowing into gaseous fuel chamber 34 is warmed by heat from a hot liquid, such as engine coolant, communicated to the fuel through fins 38 visible in FIG. 3A surrounding hot liquid coolant passage 16, through which engine coolant is circulated via hot liquid inlets 15, also shown in FIG. 3A. Such elevation of the temperature of the fuel is achieved primarily during cruise and medium speed operation of the engine. At higher engine speed operation, gaseous fuel passes through the converter so quickly that the temperature thereof is not significantly affected, which is desirable because it is beneficial for an engine to run with cooler gaseous fuel at higher speeds because secondary cooling by the fuel improves the volumetric efficiency of the engine. The engine thus runs slightly richer at wide open throttle since more fuel is contained in a given volume of fuel at lower gaseous fuel temperatures. Conversely, during cruise conditions, a lesser quantity of fuel is contained in a given volume of gaseous fuel as a result of elevation of the gaseous fuel temperature within converter 1, and a relatively leaner fuel mixture results.

Additionally, a duct 43 (shown in FIGS. 1 and 3B) communicating with engine manifold chamber 40, where engine manifold pressure is maintained, also communicates through passages 45 in converter cap 17 with a bellows 29, which is located inside the main diaphragm spring 20 and is biased against main diaphragm 21 by a means for yieldably forcing the bellows 29, such as bellows spring 44 inside of bellows 29. Thus, during cruise conditions, when the engine intake manifold pressure is between 7 inches h.g. and 20 inches h.g., bellows 29 contracts responsive to reduced intake manifold pressure, thereby decreasing the pressure on main diaphragm 21 and thus reducing the pressure level maintained in gaseous fuel chamber 34 from the normal level of approximately 11 inches w.c. Main diaphragm spring 20, bellows spring 44 and bellows 29 are selected to cooperate such that the pressure will be reduced in gaseous fuel chamber 34 during cruise conditions to approximately 8 inches w.c. This pressure reduction further reduces fuel flow to the mixer 100 during cruise conditions, thereby automatically providing for a lean fuel mixture (lower fuel-to-air mixture ratio) desirable for fuel economy during cruise conditions.

FIGS. 2 and 4 show section and exploded views, respectively, of a first alternative preferred embodiment of the mixer of the present invention, indicated by numeral 100 on FIG. 2. Mixer 100 includes, generally, (a) body structure including fuel inlet elbow 101, which forms a pressurized gaseous fuel passage 102, and cylinder 103 and (b) a plunger structure comprising piston 104 which moves within cylinder 103. Attached to piston 104 is needle 106 which cooperates with an orifice 114 above pressurized gaseous fuel passage 102 to form a needle valve-type structure which controls passage of pressurized gaseous fuel through valve passage 121 and into mixing chamber 115. Needle 106 may be removably attached to piston 104 by threading, press fitting or other conventional mounting means to permit interchangeable use of needles having different tapers appropriate for use with different gaseous fuels. Generally, a steeper needle taper is required for use with a fuel having a relatively smaller energy content and therefore requiring a higher fuel-to-air ratio for proper combustion.

Operation of mixer 100 may be understood by reference to FIGS. 2 and 4. At starting in the "propane" mode, engine starting venturi vacuum is communicated to mixing chamber 115 through conventional carburetor 110 and carburetor adapter 109. Such reduction of pressure within mixing chamber 115 is also communicated to the upper side of piston 104 via piston orifices 108. The lower side of piston 104 disposed radially outward of annular surface 137 on piston lifter 122 is subjected to outside atmospheric pressure communicated through air filter 113, which is held in place by air filter top plate 142. Such atmospheric pressure acting on the lower side of piston 104 urges the piston upward, overcoming the resistance of a yieldable bias means, such as spring 105, which urges piston 104 downward. Upward movement of piston 104, which is guided by sliding contact between the outside surface of fuel transfer tube 107 and the inner surface of piston cavity 125, lifts needle 106 from the annulus of contact 124 between the needle 106 and fuel transfer tube 107 at orifice 114, thereby permitting gaseous fuel within pressurized gaseous fuel passage 102 to flow through orifice 114 and valve passage 121 into piston cavity 125 and thence into mixing chamber 115 through fuel ports 123 (visible only in FIG. 2) in piston 104. Additionally, atmospheric air flows through the air filter 113 and as indicated by arrows 126 into mixing chamber 115 through the air passage which opens between piston 104 and piston lifter 122 when piston 104 moves upward, and such air continues to flow toward the engine through mixing chamber 115. Thus, gaseous fuel and atmospheric air mix within mixing chamber 115 and as both are drawn into conventional carburetor 110 through carburetor adapter 109.

The above-described flow of pressurized gaseous fuel and atmospheric air into mixing chamber 115 increases the pressure in the air passage within carburetor adapter 109, which increase in pressure is communicated to the top side of piston 104 via piston orifices 108. Resulting equalization of pressure on both sides of piston 104 permits spring 105 to urge piston 104 downward, thereby reducing the flow of gaseous fuel and atmospheric air into mixing chamber 115, which, in turn, results in a decrease in pressure in mixing chamber 115 as a consequence of venturi vacuum and repeat of the above-described sequence, which tends toward an equilibrium condition at each engine speed.

Provision is also made for separately controlled supply of atmospheric air and pressurized gaseous fuel to mixing chamber 115 at engine idle speeds while piston 104 remains in its downmost position. Gaseous fuel may pass through idle inlet tunnel 127 in needle 106, which inlet is variably partially obstructed by an adjustable valve means such as idle fuel adjustment screw 128. Idle adjustment screw 128 is adjusted by insertion of a screwdriver through the access 143 in inlet elbow 101 created by removal of plug 120. Idle inlet tunnel 127 is positioned through the needle 106 surface above and below the annulus of contact 124 around orifice 114 to communicate with the needle 106 surface above and below the annulus of contact 124 so that fuel may pass from pressurized gaseous fuel passage 102 through idle inlet tunnel 127 and into valve passage 121. Air is admitted to mixing chamber 115 through idle air orifice 129 in piston lifter 122, and such air is metered by an adjustable valve means, such as by idle air adjustment screw 130. Such separate provision for supply at engine idle speeds permits improved control of air and fuel during idle without materially affecting fuel and air supply at higher engine speeds.

During "gasoline" mode operation of the dual fuel system, venturi vacuum communicated to the top side of piston 104 causes the piston 104 to be raised as described above, resulting in flow of air between the bottom side of piston 104 and annular surface 137 of piston lifter 122 as indicated by arrows 126 and into then functioning conventional carburetor 110 through mixing chamber 115.

More fuel efficient operation may be achieved by providing optional means for mechanically lifting piston 104 to permit flow of air as indicated by arrows 131 under piston lifter 122 when the "gasoline" mode is selected and mixer 100 is not functioning. Such lifting may be accomplished by addition of lifter actuator 132. In use, lifter actuator 132 is slightly rotated about its vertical axis by an actuation means, such as control cable 133 connected to control cable connector 134 and operated by a control means, which may conveniently be fluid dual valve control 301, shown in FIG. 1, which also actuates fluid dual valve 300. Such rotation results in sliding movement of lifter actuator arms 135 against camming surfaces 136 on piston lifter 122, thereby urging piston lifter 122 upward against the resistance of springs 140 surrounding pins 141 (one set of which pins and springs is shown in FIG. 4), thus permitting flow of air under piston lifter 122 and into conventional carburetor 110. Upon reverse rotation of lifter actuator 132 in response to movement of control 301, piston lifter 122 is pulled down to its normal, seated position by springs 140. Rotation of lifter actuator 132 in the desired direction with coupling to control 301 as shown in FIG. 1 requires that cable 133 pass through a bell crank (not shown) or other means to reverse cable movement or, alternatively, cable 133 may be coupled to lifter actuator 132 to rotate it in the opposite direction from that achieved by connection as shown in FIG. 4.

Alternatively, a second optional means for providing free air flow to the conventional carburetor 110 during "gasoline" operation of the dual fuel system may be achieved by providing communication between the top side of piston 104 and a vacuum source during "gasoline" operation, which thereby reduces the pressure on the top side of piston 104, resulting in movement of piston 104 upward responsive to atmospheric pressure on its lower side, thus permitting free flow of air between piston 104 and annular surface 137 on piston lifter 104. Provision for such communication is shown in FIGS. 1 and 2 by mixer vacuum line 138 which communicates with the top side of piston 104 through cylinder fitting 139, visible in FIG. 4, and connects to second vacuum outlet port 313 in fluid dual valve body 307. When fluid dual valve control 301 is positioned in the "gasoline" mode, duct 315 in spool 306 communicates between vacuum inlet port 311 and second vacuum outlet port 313, as is shown in FIG. 13, thereby resulting in communication of engine intake manifold vacuum to the top side of piston 104 through mixer vacuum line 138.

FIGS. 5 and 6 show section views and FIG. 7 shows an exploded view of an alternative embodiment of the mixer assembly of the present invention, indicated by numeral 200. In this embodiment, mixer 200 includes, generally, (a) body structure comprising mixer body 201 and fuel transfer tube 207, which together form a pressurized gaseous fuel passage 202, and cylinder 203 and (b) a plunger structure comprising a piston 204, which moves within cylinder 203, and piston actuator 221 of substantially oval cross section. Mixer body 201 also forms an air passage 216 shown in FIGS. 6 and 7 into which piston actuator 221 projects with the greater oval axis of the cross section of piston actuator 221 oriented transverse to air passage 216 for movement therein to variably restrict air flow. Movement of the plunger structure (comprising piston actuator 221 and piston 204) is guided by sliding contact between a portion of the outside surface of fuel transfer tube 207 and arcuate sliding surfaces 227 in piston actuator cavity 225. Attached to piston 204 is a needle 206, which moves within orifice 214 of pressurized gaseous fuel passage 202 to form a needle valve-type structure which controls passage of the pressurized gaseous fuel into mixing chamber 215. Needle 206 may be removably mounted in the plunger structure by employing threading, press fitting or other conventional mounting means to permit interchangable use of needles having different tapers appropriate for use with different gaseous fuels as described above in connection with mixer 100.

Operation of second embodiment of mixer 200, which is similar to operation of first embodiment of mixer 100, may be understood by reference to FIGS. 5, 6 and 7.

At starting in "propane" mode operation, engine starting venturi vacuum is communicated to mixing chamber 215 and the downstream side of air passage 216 through a conventional carburetor 210 and carburetor adaptor 209. Such venturi vacuum is also communicated to the back side 222 of piston 204 through piston orifices 208. The front side 223 of piston 204 is substantially subjected to outside atmospheric pressure communicated through air filter 213 and into cylinder 203 through mixer body 201 holes 224 (visible in FIG. 7). Such atmospheric pressure acting on the front side 223 of piston 204 urges piston 204 against the resistance of a yieldable bias means such as spring 205, and the reduced pressure on the back side 222 of piston 204 induced by venturi vacuum. Such movement of piston 204 moves piston actuator 221 and needle 206. Movement of needle 206 away from orifice 214 at the end of fuel transfer tube 207 permits gaseous propane within pressurized gaseous fuel passage 202 to flow into piston actuator cavity 225 and thence into air passage 216 in mixer body 201 and into mixing chamber 215. Venturi vacuum also draws atmospheric air through air filter 213 and air passage 216 past piston actuator 221 and into mixing chamber 215. Thus, gaseous fuel and atmospheric air mix within mixing chamber 215 as both are drawn into conventional carburetor 210 through carburetor adapter 209. Baffle 234 attached to housing 228 serves to break up air and fuel flow and induce turbulence so that such flow will not stratify and limit flow into the engine.

The above-described flow of pressurized gaseous fuel and atmospheric air into mixer body 201 increases the gaseous pressure within the mixer body, which increase in pressure is communicated to the back side 222 of piston 204 through piston actuator 221 orifices 208. Resulting equalization in pressure on both sides of piston 204 permits spring 205 to urge piston 204 and the structures attached thereto toward mixer body 201, thereby reducing the flow of gaseous propane between orifice 214 and needle 206 into piston actuator cavity 225 and thence into mixer body 201, and movement of piston actuator 221 projecting into mixer body 201 reduces the flow of atmospheric air through mixer body 201. Such reduction in air and fuel flow, in turn, results in a decrease in pressure on the downstream side of air passage 216 as a consequence of venturi vacuum and repeat of the above-described sequence, which tends toward an equilibrium condition at each engine speed.

Provision is made for controlled supply of atmospheric air and pressurized gaseous fuel to the engine by second mixer embodiment 200 at engine idle speeds by providing a means for adjustably inhibiting projection of piston actuator 221 into mixer body 201 such as screw 226 which passes through mixer body 201 and contacts the end of piston actuator 221, thereby limiting travel of piston actuator 221 and piston 204 and needle 206 rigidly connected thereto. Such limitation of travel provides a minimum passage for atmospheric air through air passage 216 and maintains a passage for gaseous propane between orifice 214 and needle 206.

During "gasoline" mode operation of the dual fuel system, as with first mixer embodiment 100, venturi vacuum communicated to the back side 222 of piston 204 against spring 205 as described above results in withdrawal of piston actuator 221 from air passage 216, thereby permitting flow of air through air passage 216. More fuel efficient operation may be achieved by provision of an optional air valve providing a passage for air bypassing air passage 216. Such an optional air valve, best shown in FIG. 7, is provided in mixer 200 by openings 229 in housing 228 which align with air valve plate openings 231 in air valve plate 230 which is rotated by a control cable 232, which may conveniently be actuated by control 301 by coupling to control 301 in place of cable 133 shown in FIG. 1.

Inadvertent incorrect orientation of the plunger structure of second mixer embodiment 200 to mixer body 201 during assembly or reassembly after servicing may be prevented by providing piston actuator 221 with an irregular cross sectional shape, as for instance, by the provision of ridge 233 so that piston actuator 221 will be received in mixer body 201 only in the correct orientation.

Although the present invention is described and illustrated above with detailed reference to the preferred embodiments, the invention is not intended to be limited to the details of such embodiments but includes numerous modifications and changes thereto while still falling within the intent and spirit hereof.

I claim:

1. A dual fuel system for an internal combustion engine comprising:
   (a) a fluid dual valve actuated by a manual control to permit flow of liquid fuel to the engine's carburetor when the control is in a first position and to prevent such flow when the control is in a second position;
   (b) a liquified gas to gaseous fuel converter actuated by a decrease in engine manifold pressure communicated from the engine to the converter through the fluid dual valve when the control is in the second position; and
   (c) a mixer which mixes gaseous fuel supplied by the converter with air and supplies the mixture to the engine when the control is in the second position and which permits flow of air to the engine's carburetor when the control is in the first position.

2. A dual fuel system for an internal combustion engine comprising:
   (a) a converter body forming a liquified fuel passage and a gaseous fuel chamber;
   (b) a liquid fuel inlet valve yieldably biased toward a closed position and a first actuator responsive to a drop in engine manifold pressure to actuate the liquid fuel inlet valve for permitting fuel to flow into the liquified fuel passage;
   (c) a gaseous fuel inlet valve between the liquified fuel passage and the gaseous fuel chamber which valve is yieldably biased toward a closed position and a second actuator responsive to a pressure drop in the gaseous fuel chamber to actuate the gaseous fuel valve for permitting fuel flow into the gaseous fuel chamber;
   (d) a mixer body forming an air passage and a pressurized gaseous fuel passage communicating with the gaseous fuel chamber and having an orifice communicating with the air passage;
   (e) a plunger proximate the air passage for movement to variably restrict air flow through the air passage;
   (f) a means for yieldably biasing the plunger in one direction of movement, the plunger having a surface communicating with the air passage at the downstream side of the plunger to receive application of vacuum tending to move the plunger in the opposite direction against resistance imposed by the yieldable bias means;
   (g) a needle positionable within the orifice, one of the orifice and needle being movable relative to the other by the plunger to control the flow of gaseous fuel through the orifice;
   (h) a valve body having a liquid inlet opening, a vacuum outlet opening, a vacuum inlet port, a vacuum outlet port communicating with the first actuator, and a vent; and
   (i) a spool rotatable within the valve body in response to a control, said spool having a tunnel communicating between the liquid inlet opening and the liquid outlet opening when the control is in a first position, a duct communicating between the vacuum inlet port and the vacuum outlet port when the control is in a second position, and a notch communicating between the vacuum outlet port and the vent when the control is in the first position.

3. A dual fuel system according to claim 2, wherein the first actuator comprises a first diaphragm having one side communicating with the vacuum outlet port and the opposite side communicating with the external atmosphere and a valve linkage communicating between the first diaphragm and the liquified fuel inlet valve; and wherein the second actuator comprises a second diaphragm of substantially the same size as the first diaphram having one side exposed to the gaseous pressure within the gaseous fuel chamber and the opposite side communicating with the external atmosphere, a valve actuator communicating between the gaseous fuel inlet valve and the second diaphragm and a yieldable means for resisting diaphragm deflection induced by increased pressure in the gaseous fuel chamber and for urging the second diaphragm against the valve actuator.

4. A dual fuel system according to claim 3, further comprising means for automatically providing a lean fuel mixture of gas and air to the engine during cruise conditions by reducing the pressure of fuel in the gaseous fuel chamber, comprising:
   (a) a bellows and a means for yieldably forcing the bellows against the external atmosphere side of the second diaphragm, and
   (b) a means for contracting the bellows in response to a drop in engine manifold pressure to reduce the force exerted by the yieldable forcing means and bellows on the second diaphragm.

5. A dual fuel system according to claim 4, wherein:
   (a) the bellows contracting means comprises a second duct within the converter body structure communicating between the bellows and an engine manifold pressure chamber formed by the body structure and one side of the first diaphragm, and
   (b) the converter body is provided with a means for circulating liquid in heat transfer relation with the gaseous fuel chamber.

6. A dual fuel system according to claim 2, wherein the plunger includes a piston defining said surface, the piston having an oppositely facing surface communicating with the air passage at the upstream side of the plunger, the mixer body includes a cylinder receiving the piston and the yieldable bias means comprises a spring urging the plunger toward the orifice.

7. A dual fuel system according to claim 6, wherein a portion of the plunger projects within the air passage for movement therein to variably restrict air flow through the passage and has a substantially oval cross section with the greater oval axis transverse to the air passage.

8. A dual fuel system according to claim 6, wherein the plunger has a cavity, and the orifice and a portion of the gaseous fuel passage is within the cavity, the needle being mounted to the plunger within the cavity and being carried by the plunger to project within the orifice.

9. A dual fuel system according to claim 2, wherein the needle is provided with a tunnel positioned through the needle surface above and below an annulus of contact between the valve needle and the orifice and a screw to variably obstruct the tunnel for providing limited flow of fuel during engine idle conditions while the needle is fully closed.

10. A dual fuel system according to claim 2, further comprising means to variably inhibit travel of the plunger to a minimum air flow restricting position for permitting flow of air and fuel during engine idle conditions.

11. A dual fuel system according to claim 2, further comprising means for urging the plunger against the yieldable bias means to permit free flow of air through the air passage, said urging means comprising a mechanical linkage between the control and a third actuator, which actuator moves the plunger, when the control is moved to the first position, against the yieldable bias means.

12. A dual fuel system according to claim 2, further comprising means for urging the plunger against the yieldable bias means to permit free flow of air through the air passage, said urging means comprising a second vacuum outlet port in the valve body communicating with the plunger surface and, when the control is in the first position, communicating with the vacuum inlet port via the duct.

13. A dual fuel system according to claim 2, further comprising a mechanical linkage between the control and an air supply valve to open the air supply valve when the control is in the first position to permit flow of air to the engine's carburetor bypassing the air passage.

14. A dual fuel system according to claim 2, wherein an O-ring seated on the surface of the spool forms a seal between the spool and the valve body around the liquid inlet opening when the spool is in the second position.

15. A dual fuel system according to claim 2, wherein the needle is removably affixed to the plunger so that needles having various tapers may be interchangeably used with fuels having different properties.

16. A dual fuel system for an internal combustion engine comprising:
   (a) a first body forming a liquified fuel passage, a gaseous fuel chamber, a manifold pressure chamber, and a liquid passage for circulating liquid in heat transfer relation with the gaseous fuel chamber;
   (b) a plunger-type liquified fuel inlet valve yieldably biased toward a closed position by a first spring and actuated to permit liquified fuel to flow into the liquified fuel passage by a first diaphragm acting on a lever, said diaphragm having one side exposed to pressure in the manifold pressure chamber and the other side exposed to the external atmosphere;
   (c) a lever-type gaseous fuel inlet valve between the liquified fuel passage and the gaseous fuel chamber yieldably biased toward a closed position by a second spring and actuated to permit fuel to flow into the gaseous fuel chamber by a second diaphragm of substantially the same diameter as the first diaphragm acting on a valve actuator removably contacting the gaseous fuel inlet valve, said second diaphragm having one side communicating with the external atmosphere and the other side communicating with the gaseous fuel chamber;
   (d) a diaphragm spring and a bellows and a bellows spring resisting second diaphragm deflection induced by increased pressure in the gaseous fuel chamber and urging the second diaphragm against the valve actuator, said bellows communicating with the duct to contract in response to a pressure reduction in the manifold pressure chamber to reduce resistance to deflection of the second diaphragm induced by increased pressure in the gaseous fuel chamber;
   (e) a second body forming an air passage, a pressurized gaseous fuel tube communicating with the gaseous fuel chamber and with the air passage via an orifice, and a cylinder;
   (f) a plunger having a portion of substantially oval cross section projecting within the air passage for movement therein to variably restrict air flow through the passage and a piston for movement within the cylinder, said piston having a surface communicating with the air passage at the downstream side of the plunger to move the plunger in a direction opposite resistance imposed by a piston spring and an oppositely facing surface communicating with the air passage at the upstream side of the plunger, said oval portion having a cavity, a portion of the wall of which contacts the tube to guide the plunger;

(g) a needle removably affixed to the plunger within the cavity and positionable within the orifice to control the flow of gaseous fuel through the orifice;

(h) an adjustable stop to variably inhibit travel of the plunger structure to its fully projecting position to permit flow of air and gas during engine idle conditions;

(i) a third body having a liquid inlet opening, a liquid outlet opening, a vacuum inlet port for communication with the engine's intake manifold, a vacuum outlet port communicating with the manifold pressure chamber, and a vent;

(j) a spool manually rotatable within the third body in response to a control, said spool having a tunnel communicating between the liquid inlet opening and the liquid outlet opening when the spool is in a first position; a second duct communicating between the vacuum inlet port and the vacuum outlet port when the spool is in a second position, a notch communicating between the vacuum outlet port and the vent when the spool is in the first position, and an O-ring seated on the surface of the spool to form a seal between the spool and the third body around the liquid inlet opening when the spool is in the second position; and (k) a mechanical linkage between the control and an air supply valve to open the air supply valve when the control is in the first position to permit flow of air to the engine's carburetor bypassing the air passage.

17. A duel fuel system for an internal combustion engine comprising:

a converter for converting liquified fuel to a gaseous fuel, said converter having a gaseous fuel chamber with a liquified fuel inlet aperture, an engine vacuum inlet aperture and an outlet aperture adapted for communication with the carburetor of an internal combustion engine, said converter being operable responsively to engine manifold vacuum and to the pressure within said fuel chamber to pass gaseous fuel from said inlet aperture to said outlet aperture under a positive pressure;

a mixer for mixing air with a gaseous fuel for application to a combustion chamber, said mixer having a mixing chamber with an air inlet passageway adapted for fluid communication with a source of air, a gaseous fuel inlet aperture in fluid communication with the outlet aperture of said converter, an outlet aperture adapted for fluid communication wtih the carburetor of an internal combustion engine, air valve means for restricting the passage of air from said air inlet aperture to said outlet aperture responsively to engine venturi vacuum, and fuel valve means for restricting the passage of gaseous fuel from said fuel inlet aperture to said outlet aperture responsively to movement of said air valve means; and a manually operable valve adapted for fluid communication with a source of liquified gas, a source of gasoline, atmospheric pressure and engine manifold vacuum, said valve being operative in a first position to pass gasoline to the carburetor of the internal combustion engine and being operative in a second position to pass liquified gas to the inlet aperture of said converter, and to apply engine vacuum to the engine vacuum inlet aperture of said converter.

18. The system of claim 17 wherein the response of said second valve means to the pressure within said fuel chamber is modulated as a direct function of engine manifold vacuum.

19. The system of claim 17 including means for adjusting the idle position of said mixer without adjusting the response characteristics thereof to engine demand.

20. The system of claim 17 wherein said fuel valve means is located within an axial passage in said air valve means.

21. The system of claim 17 wherein said air valve means includes a cylinder having a flat bladed extension, said extension apertured to receive a portion of said fuel valve means.

22. The system of claim 17 wherein said mixer includes:

a mixing chamber having a generally rectangular air inlet passageway in fluid communication with a source of air, a fuel inlet tube adapted for fluid communication with a source of a gaseous fuel, and an outlet passageway adapted for fluid communication with a combustion chamber; and valve means for restricting the passage of air through said air inlet passageway to said outlet passageway and for restricting the passage of gaseous fuel from said fuel inlet tube to said outlet aperture, said valve means including a piston slidable within a chamber and having a generally flat bladed projection, the axis of said cylinder being normal to said air inlet passageway and said chamber being disposed relative to said air inlet passageway so that said flat bladed projection variably restricts the flow of air through said air inlet passageway responsively to the position of said piston in said cylinder, said fuel inlet tube supporting said piston within said cylinder.

23. The system of claim 22 wherein said converter comprises:

a gaseous fuel chamber having an inlet aperture adapted for communications with a source of liquified gas, an outlet aperture adapted for communications with the carburetor of an internal combustion engine, and a plurality of internal partitions defining a convoluted passageway between said inlet and outlet apertures;

first valve means being operable responsively to engine manifold vacuum to pass liquified gas from said inlet aperture to said second valve means, and second valve means being operable responsively to the pressure within said fuel chamber to pass liquified gas to said fuel chamber, said second valve means includes a diaphragm the movement of which is responsive to the pressure differential between atmospheric pressure and the pressure within said fuel chamber of less than about one third pounds per square inch;

means for modifying the response of said second valve means to the pressure in said fuel chamber in response to engine vacuum, the effects of an increase into engine manifold vacuum being opposed to the effects of an increase in the pressure within said fuel chamber;

a passageway adapted for fluid communication with a source of engine coolant, the walls of said passageway being is a heat transfer relationship to the partitions in said fuel chamber, whereby liquified gas may be passed from said inlet aperture through the heated and convoluted passageway in said fuel chamber for conversion to a gaseous fuel and for subsequent passage through said outlet aperture under a positive pressure to the carburetor of an internal combustion engine.

24. The system of claim 17 wherein said converter comprises:
a gaseous fuel chamber having an inlet aperture adapted for communications with a source of liquified gas, an outlet aperture adapted for communications with the carburetor of an internal conbustion engine, and a plurality of internal partitions defining a convoluted passageway between said inlet and outlet apertures;
first valve means being operable responsively to engine manifold vacuum to pass liquified gas from said inlet aperture to said second valve means, and
second valve means being operable responsively to the pressure within said fuel chamber to pass liquified gas to said fuel chamber, said second valve means includes a diaphragm the movement of which is responsive to the pressure differential between atmospheric pressure and the pressure within said fuel chamber of less than about one third pounds per square inch;
means for modifying the response of said second valve means to the pressure in said fuel chamber in response to engine vacuum, the effects of an increase into engine manifold vacuum being opposed to the effects of an increase in the pressure within said fuel chamber;
a passageway adapted for fluid communication with a source of engine coolant, the walls of said passageway being is a heat transfer relationship to the partitions in said fuel chamber,
whereby liquified gas may be passed from said inlet aperture through the heated and convoluted passageway in said fuel chamber for conversion to a gaseous fuel and for subsequent passage through said outlet aperture under a positive pressure to the carburetor of an internal combustion engine.

25. A method of operating an internal combustion engine on a liquified fuel comprising the steps of:
(a) manually positioning a fuel selector switch;
(b) converting a liquified fuel to a gaseous fuel responsively to the position of the fuel selector switch, to engine manifold vacuum, and to the pressure of the converted fuel;
(c) metering air to the carburetor of the internal combustion engine responsively to carburetor venturi vacuum; and
(d) metering gaseous fuel to the carburetor of the internal combustion engine responsively to the metered flow of air.

* * * * *